United States Patent Office 3,333,399
Patented Aug. 1, 1967

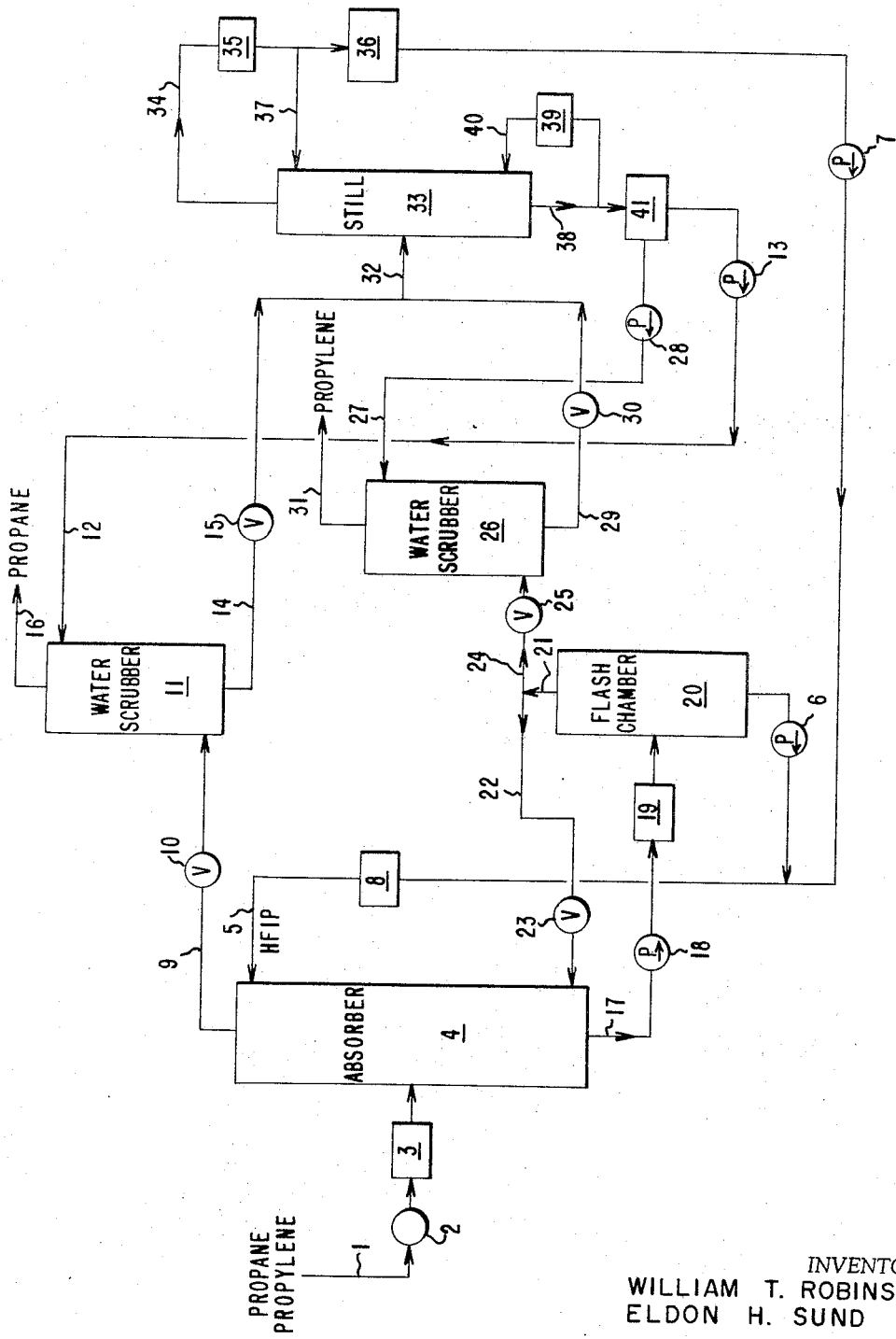

3,333,399
SELECTIVE ABSORPTION OF GASEOUS
HYDROCARBONS WITH HEXAFLUORO-
ISOPROPYL ALCOHOL
William T. Robinson, Wilmington, and Eldon H. Sund, Newark, Del., assignors to E. I. du Pont de Nemours and Company, Wilmington, Del., a corporation of Delaware
Filed Oct. 29, 1964, Ser. No. 407,381
11 Claims. (Cl. 55—56)

This invention relates to the separation, by selective absorption in a solvent, of gaseous unsaturated hydrocarbons from their mixtures with more highly saturated gaseous hydrocarbons.

Increasing quantities of pure acetylenic, olefinic, and paraffinic hydrocarbon gases are being required for the production of elastomers, polymers, plastics, and industrial chemicals. Many different processes have been devised for making the separations required to obtain these gases in pure form from the complex mixtures in which they are usually first obtained, but more efficient and less expensive processes are still desired. Distillation and selective solvent processes have been used most widely.

Many substances have been proposed for use in the solvent refining of liquid petroleum products, such as gasoline, kerosene, lubricating oils and the like. Among such solvents are isopropanol in U.S. Patents 1,825,762, 2,424,158, and 2,453,933, and highly fluorinated compounds in U.S. Patent 2,582,197. However, those skilled in the art have not found such substances to be generally satisfactory for the selective solvent absorption of gaseous hydrocarbon mixtures. Fleck et al., in U.S. Patent 2,952,-717, have disclosed broadly that a wide variety of hydrocarbon mixtures, including normally gaseous hydrocarbons, can be separated by a dual solvent extraction process, employing certain perfluoro compounds as primary solvents and certain polar organic compounds (immiscible with the perfluoro compounds) as secondary solvents, but treats the hydrocarbons in the liquid phase. A more simple procedure, employing a single solvent, is desired.

A variety of solvents have been proposed for the separation of gaseous hydrocarbons of different degrees of unsaturation by selective solvent absorption processes, such as amides and other amino carbonyl compounds represented by dimethyl formamide, certain ketones, dimethylsulfoxide, and certain heterocyclic compounds, as disclosed in U.S. Patents 2,386,927, 2,907,409 and 3,082,-271. Such solvents have one or more undesirable properties, such as being difficult to remove from the hydrocarbons and recover for reuse, unstable, reactive with the more active unsaturated compounds, have only limited selectivity, toxic, uneconomically expensive, or the like.

The distillation processes frequently require large and complicated equipment operating under extremes of temperature and pressure because of the small differences in boiling point on which they are based. The selective solvent processes are also complex because of the small differences in solubility of hydrocarbons of different types and structures in most solvents. Special steps must be introduced into many of these processes to separate components which are present in only small amounts, which are more reactive than the principal components, or which differ significantly from the principal components in physical properties.

Thus, the production of pure ethylene for polymerization and for use as a chemical intermediate usually involves the cracking of a higher hydrocarbon and the separation of ethylene from the mixture which is obtained. This mixture usually includes acetylenic and diolefinic compounds in small amounts. Improved processes for separating such trace components from crude gas mixtures and for separating ethylene from ethane will find commercial use. The production of pure propylene and pure butenes involves similar problems.

At present, propylene (B.P. —47° C.) is separated from propane (B.P. —42° C.) by fractional distillation at low temperatures and/or high pressures. One commercial installation operates at about 50° C. and 300 p.s.i.g. with two columns in series, each of which is 132 feet high. This combination of temperature and pressure represents a compromise which permits use of cooling water at ordinary temperatures but requires expensive pressure equipment of large size. Operation of the process to obtain pure propylene is also sensitive to changes in cooling water temperature, pressure control, and the composition of the feedstock. Starting up such a large distillation system involves long times for obtaining equilibrium conditions and the introduction of large amounts of raw materials, so such a system is practical only in units of very large capacity.

Butenes are separated from butanes by a combination of chemical extraction, fractional distillation, and extractive distillation. Thus, a crude mixture freed of materials boiling below about —15° C. and above about 10° C. is treated with sulfuric acid to extract isobutylene (B.P. —6° C.) as the sulfate ester and then distilled to obtain two fractions (a) isobutane (B.P. —10° C.) and 1-butene (B.P. —5° C.) and (b) n-butane (B.P. —0.6° C.), cis-2-butene (B.P. 1° C.) and trans-2-butene (B.P. 2.5° C.). These two fractions are separated and distilled extractively with a suitable entraining solvent (mixtures of furfural and water or acetone and water and single solvents like acetonitrile) to obtain the saturated hydrocarbons as overhead fractions and mixtures of the unsaturated hydrocarbons and the solvent as bottom fractions. The bottom fractions of unsaturated hydrocarbons and the entrainer are then separated by distillation and the solvent is recycled. Any butadiene in the original feed stock (seldom present unless the process is integrated with a butadiene production unit) is concentrated in the 1-butene fraction, from which it can be separated by any of several processes. This multi-step process involves several pieces of equipment, considerable handling of materials, and the separate production of a number of product streams which may later be combined for subsequent use or further processing.

It is an object of this invention to provide a new and improved process for the treatment of gaseous mixtures of normally gaseous hydrocarbons of varying degrees of unsaturation so as to separate them according to their differing degrees of unsaturation. Another object is to provide a process of such character which employs a single solvent that is unusually efficient to selectively absorb the more highly unsaturated hydrocarbon gases. A further object is to provide for such a process a solvent which is readily separated from the gaseous hydrocarbons and recovered for reuse, and which is safe and economical to use. Other objects are to advance the art. Still other objects will appear hereinafter.

The above and other objects are accomplished by the process for separating components of a mixture of normally gaseous hydrocarbons which comprises (a) Contacting a gaseous mixture of hydrocarbons which consists essentially of a plurality of normally gaseous acyclic hydrocarbons of 2–4 carbon atoms which have normal boiling points within 25° C. of each other, of which at least one is a member of a class of the group consisting of paraffinic, monoolefinic and diolefinic hydrocarbons and at least one other is a member of a more unsaturated class of the group consisting of monoolefinic, diolefinic and acetylenic hydrocarbons;

(b) With liquid hexafluoroisopropyl alcohol and absorbing therein said other hydrocarbon;

(c) Separating the liquid solvent phase from the gaseous raffinate phase; and (d) Recovering the absorbed hydrocarbon from the hexafluoroisopropyl alcohol in the liquid solvent phase.

By the above defined process, gaseous mixtures of normally gaseous hydrocarbons of varying degrees of unsaturation can be separated into their component hydrocarbons according to their differing degrees of unsaturation or into fractions enriched in the hydrocarbons or different degrees of unsaturation, i.e. to separate the unsaturated hydrocarbons from the saturated (paraffinic) hydrocarbons and to separate the more highly unsaturated hydrocarbons from the less highly unsaturated hydrocarbons. It has been found that liquid hexafluoroisopropyl alcohol is an unusually attractive solvent for use in the selective absorption process of this invention. In general, its ability to dissolve the hydrocarbons of 2–5 carbon atoms from gaseous mixtures thereof varies greatly with the degree of unsaturation of the hydrocarbons, increasing significantly with unsaturation, from paraffinic to monoolefinic to diolefinic to acetylenic unsaturation. In addition, it is readily separated from the hydrocarbons by simple and economical methods, and so recovered in high yield for reuse.

The preparation and properties of hexafluoroisopropyl alcohol are described by Middleton in his copending application Ser. No. 238,703, filed Nov. 19, 1962, now Patent No. 3,227,674, as a continuation-in-part of his copending application Ser. No. 107,302, filed May 3, 1961 and now abandoned, and in his copending application Ser. No. 355,433, filed Mar. 27, 1964. Hexafluoroisopropyl alcohol can be obtained by treatment of hexafluoroacetone with a reducing agent such as lithium hydride or sodium borohydride in a suitable solvent or by hydrogenation of hexafluoroacetone over a catalyst such as platinum. The resulting alcohol, which has the structure $CF_3CH(OH)CF_3$ and can also be called hexafluoropanol, 2-H-hexafluoro-2-propanol, or 1,1,1,3,3,3-hexafluoro-2-propanol, is a water-white liquid which boils at 59° C. at 760 mm., melts at −1° C., and has a refractive index of below 1.3 at 20° C. and a calculated critical temperature of 182° C. It is miscible with water in all proportions and yet is easily separated from water by distillation. It has a high solvency for polar organic compounds, including olefinic hydrocarbons, and yet is easily separated from them. It is of low toxicity, with an approximate lethal concentration for rats of 3200 p.p.m. in air.

Several other properties also make hexafluoroisopropyl alcohol a particularly attractive solvent for use in the absorption process of this invention. Especially important are its lack of reactivity with and the relatively high solubility in it of olefinic and acetylenic hydrocarbons. Usually, a ratio in solubilities of over about two is desired for an absorption solvent to be considered commercially attractive in this property. Solvents, other than hexafluoroisopropyl alcohol, which give a higher ratio than 2 are less easily obtained, are less easily separated from dissolved gases because they boil at less convenient temperatures, or are less soluble in water. In some instances, the solubility ratio in hexafluoroisopropyl alcohol is somewhat below 2. However, effective separation can be obtained in such instances by the use of sufficiently large and complicated equipment or by repeated treatments of the extract or raffinate products, which is facilitated and rendered more practical by the ease of separation and recovery of the hexafluoroisopropyl alcohol from the hydrocarbons.

The mixtures which are to be separated by the process of this invention are narrow-boiling mixtures of normally-gaseous hydrocarbons, which boil in such a narrow range that their separation by fractional distillation is impractical in simple and inexpensive equipment but require elaborate distillation systems which in turn require large amounts of gases such that they are practical for use only in the larger oil refineries. The term "normally-gaseous" will be understood to means that the mixtures of gases and the components thereof exist as gases at normal atmospheric temperature and pressure, e.g. have boiling points below about 21° C. at 760 mm. of Hg. Such mixtures will consist essentially of a plurality of normally gaseous acyclic hydrocarbons of 2–4 carbon atoms which have normal boiling points (at normal atmospheric pressure) within 25° C. of each other, at least one of said hydrocarbons being a member of a class of the group consisting of paraffinic, monoolefinic and diolefinic hydrocarbons and at least one other of said hydrocarbons being a member of a more unsaturated class of the group consisting of monoolefinic, diolefinic and acetylenic hydrocarbons. Such mixtures may and frequently will contain small amounts, up to about 5 mole percent, of other gaseous hydrocarbons boiling outside said range and small amounts of other impurities as will be pointed out hereinafter.

The process will not completely separate acetylenic, olefinic, and paraffinic hydrocarbons in mixtures containing both two-carbon and three-carbon or both three-carbon and four-carbon hydrocarbons. Such mixtures should be separated into fractions which contain only two-carbon, three-carbon, or four-carbon hydrocarbons before selective absorption, if complete separation is to be obtained. For instance, any ethylene, contained in a gaseous mixture extracted to separate propylene from propane, will largely remain in the unabsorbed propane stream, so that production of pure propane by the process of this invention requires essentially complete removal of ethylene and ethane from the propane-propylene feed gas mixture before extraction. Such removal of ethylene and ethane is relatively easy to accomplish by fractionation at low temperatures and/or high pressures which liquefy propane and propylene. Similarly, the solubility of n-butane in hexafluoroisopropyl alcohol is greater than that of propylene, so extraction of a mixture containing both will not give a clean separation of unsaturated hydrocarbons. However, where such clean separation is not required, such mixtures of hydrocarbons of different numbers of carbon atoms can be treated by the process of this invention.

Preferably, therefore, the gaseous mixture will consist essentially of a plurality of normally gaseous acyclic hydrocarbons of the same number of carbon atoms in the range of 2–4 carbon atoms of which at least one contains a lesser number of hydrogen atoms than another, i.e. will be more unsaturated than the other. That is, the mixture will consist essentially of (1) at least 2 members of the group of ethane, ethylene and acetylene, (2) at least 2 members of the group of propane, propylene, allene (propadiene), and methyl acetylene; or (3) at least 2 members of the classes of butanes, butenes, butadienes, and ethyl acetylene.

The gas-liquid absorption process of this invention can be operated on mixtures which are conveniently obtained in the normal and typical operation of petro-chemical or oil refining plants which produce mixtures of paraffinic, olefinic, and acetylenic gases. Thus, acetylene can be separated from its mixtures with ethylene and ethane. Ethylene can also be separated from ethane. Methyl acetylene and allene (propadiene) can be separated from propylene and propane. The four-carbon acetylenic, olefinic, and paraffinic hydrocarbons can also be separated according to their degrees of unsaturation.

For instance, a normally gaseous mixture of acetylene, ethylene, ethane, and small amounts (up to about 5 mole percent) of other hydrocarbons, which might be obtained from a partial oxidation or cracking process, can be selectively separated into three fractions by a two-stage selective absorption with the process of this invention. A limited amount of solvent can be used in the first stage to selectively absorb acetylene and any other higher-boiling hydrocarbons that might be present, with a minimum absorption of ethylene; and a larger amount of solvent can be used in the second stage to selectively absorb ethylene, leaving ethane unabsorbed. The purity and efficiency of separation of the components in such a process will depend on the skill and degree of refinement put into its design. By an appropriate choice of pressures, temperatures, volumes, gas-liquid contact conditions, reflux arrangements and amounts and by the other choices which are well within the skill of those accustomed to designing such processes, relatively pure streams of ethylene and ethane can be obtained.

Similarly, mixtures of methyl acetylene, allene, propylene, and propane can be separated into at least three fractions by differential absorption under appropriate conditions. The solubilities of methyl acetylene and allene in hexafluoroisopropyl alcohol are sufficiently higher than those of propylene and propane that a selective absorption with a limited amount of solvent will remove the methyl acetylene and allene from the mixture and leave a mixture of propylene and propane which can also be separated by selective absorption.

Economic factors will usually make some mixtures more attractive for separation than others, but the process will separate mixtures which contain the various hydrocarbons in any relative amounts. Thus, propylene-propane mixtures are frequently obtained which contain from about 40% to about 70% propylene and correspondingly from about 60% to about 30% propane, and such gaseous mixtures, boiling in the range from about $-50°$ C. to about $-40°$ C. at 760 mm. Hg pressure, are generally preferred. Also, hydrocarbon mixtures, boiling in the range of from about $-50°$ C. to about $-20°$ C. at 760 mm. Hg pressure and containing significant amounts of either or both of allene and methyl acetylene in addition to propane and propylene, are obtained and can be treated advantageously by the process of this invention. The preferred mixtures for economically attractive operation will probably contain more than about 40% propylene, if it is desired to obtain propylene essentially free of propane, but the process of this invention can be operated practically with mixtures which contain from very small amounts of propylene to very small amounts of propane by the use of sufficiently elaborate and efficient contacting and distilling equipment and/or by repeated treatments of the extracts and the raffinates.

Mixtures of butenes and butanes are also normally obtained in a variety of compositions, all of which can be separated by the process of this invention. Typical preferred mixtures will contain from about 25% to over 75% by weight of butenes and other 4-carbon olefins, and from about 75% to about 25% by weight of butanes and boil in the range of from about $-15°$ C. to about $+5°$ C. at 760 mm. Hg pressure; and similar mixtures which also contain significant amounts of butadienes and/or ethyl acetylene and boil in the range of from about $-15°$ C. to about $+15°$ C. The preferred compositions for commercial production of butenes will contain as high a concentration of butenes as can be practically obtained by chemical conversion and distillation separation procedures.

In general, the process is conducted by contacting the gaseous mixture of hydrocarbons with liquid hexafluoroisopropyl alcohol, that is, under such conditions of temperature and pressure as will maintain the hexafluoroisopropyl alcohol in the liquid state and the hydrocarbons in the gaseous state. It is essential that the mixture of hydrocarbons be in the gaseous state, because the hydrocarbons in the liquid state are too highly soluble in the liquid hexafluoroisopropyl alcohol. For example, liquid isobutane is completely miscible with liquid hexafluoroisopropyl alcohol at temperatures as low as $0°$ C., and liquid n-butane is completely miscible at about $20°$ C. and partly miscible at $0°$ C.

The contacting may be accomplished by any conventional procedure known to the art for obtaining efficient contact of a gas with a liquid, such as agitation in a vessel, passing the gaseous mixture and the liquid through a mixing tube, passing the gaseous mixture through a body of the liquid, counter-current flow of gas and liquid, and the like. Due to the higher solvency power of the hexafluoroisopropyl alcohol for the more highly unsaturated gaseous hydrocarbons, there will be obtained a liquid solvent phase of hexafluoroisopropyl alcohol having dissolved therein the more highly unsaturated gaseous hydrocarbon or a gaseous mixture which is enriched in the more highly unsaturated hydrocarbon; and a gaseous raffinate phase composed of the saturated or the less highly unsaturated hydrocarbon or a gaseous mixture which is enriched in the saturated or the less highly unsaturated hydrocarbon. The liquid solvent phase will be treated to remove the hexafluoroisopropyl alcohol therefrom and to recover the absorbed hydrocarbon. Also, when the gaseous raffinate phase contains entrained or vaporized hexafluoroisopropyl alcohol, it will be treated similarly.

A representative system and arrangement of apparatus, which is suitable for use in the practice of this invention, is shown schematically in the accompanying drawing, illustrating the treatment of a mixed propane-propylene gas stream.

In the drawing, a mixed propane-propylene gas stream is introduced through a feed line 1, compressed in compressor 2 and heated or cooled in heat exchanger 3 to the desired operating pressure and temperature before introduction into absorber 4 near the center. A stream of liquid hexafluoroisopropyl alcohol (HFIP) is introduced near the top of absorber 4 through line 5 with pressure applied by pumps 6 and 7, after heating or cooling to the desired temperature in heat exchanger 8. After suitable contacting in absorber 4 to provide absorption of the propylene from the gas mixture by the solvent, the unabsorbed propane is taken from absorber 4 through line 9 and passed through a pressure control valve 10 into the bottom of water scrubber 11. Water is introduced into scrubber 11 through line 12 under suitable pressure from pump 13, and removed after suitable contact with the gas in scrubber 11 through line 14 and level control valve 15 responsive to the liquid level in scrubber 11. Propane is taken from the top of scrubber 11 through line 16 for further processing or use. At the same time, a solution of propylene in the solvent hexafluoroisopropyl alcohol is taken from the bottom of the absorber through line 17, passed through a level control pump 18, responsive to the interface level in absorber 4, and through heat exchanger 19 and introduced into the middle of flash chamber 20. The desorbed propylene is taken from flash chamber 20 through line 21 and the stream is separated into two portions. One portion is returned near the bottom of absorber 4 as a reflux stream through line 22 and pressure control valve 23. The other portion is passed through line 24 and pressure control valve 25 into water scrubber 26. Water is introduced into the top of water scrubber 26 through line 27 under pressure supplied by pump 28 and removed from the bottom through line 29 and level control valve 30 responsive to the liquid level in scrubber 26. Propylene is taken from the top of water scrubber 26 through line 31 for further processing or use. The water streams containing dissolved hexafluoroisopropyl alcohol from water scrubbers 11 and 26 are combined and passed through line 32 into the center of still 33. The solvent vapors exit from still 33 through line 34 and are condensed in condenser 35, and liquid solvent passes into storage 36, a portion of the condensate stream being returned as reflux to still 33 through line 37. The recovered solvent from storage 36 is recirculated to absorber 4 through pump 7 and line 5, along with recovered solvent from flash chamber 20 and pump 6. Water, essentially free of solvent, is removed from the bottom of still 33 through line 38. One portion of this water is passed through heat exchanger 39 and back to still 33 through line 40 to provide the heat necessary for the distillation, and the remainder of the water is passed into water storage 41 for recycle to the water scrubbers 11 and 26 through pumps 13 and 28.

The various pieces of equipment shown in the drawing are conventional and well-known in the oil refining industry. The specific embodiment of the invention illustrated in the drawing is not intended to limit the invention in any way, and a number of variations will occur readily to one skilled in the design or operation of such processes for use in petroleum refineries. Thus, the types and construction of the various pieces of equipment will depend on the conditions under which the process is operated, and any of several different types of absorbers, stills, flash chambers, pumps, heat exchangers, and pressure control devices may be preferred for particular conditions. These pieces of equipment may be in any of a variety of arrangements or sequences and may have such other auxiliary equipment and controls as are desirable for their convenient or efficient operation.

The pressure and temperature of the various parts of the process operated are not critical to the invention. Thus, the absorption-extraction can be carried out under any combination of temperature and pressure which will maintain the hydrocarbon stream fed to the adsorber in the gaseous state and the hexafluoroisopropyl alcohol in the liquid state. An optimum practical combination of temperature and pressure will exist for each process which provides the most economical operation of the process under a particular set of conditions because of a balancing of the volumes and amounts of material to be handled and the cost of installing and operating the necessary equipment and of providing the heating and cooling required by the process and the temperature and pressure at which the feed gas is available from other processes.

Practical limits of temperature for the separation of propylene from propane will be from below normal ambient temperatures to 90° C. For instance, the process illustrated in the drawing can be operated with the absorber at a temperature of about 40° C. and a pressure up to 120 p.s.i.g. and with the flash chamber and water scrubbers at lower temperatures and pressures. Solubility measurements at 0° C. show the expected greater solubilities at lower temperatures.

Similarly, the process for the separation of butenes from butanes can be operated over a wide range of combinations of temperatures and pressures without departing from the spirit of the invention. Pressures with these gas mixtures will be limited by their tendency to condense at higher pressures and lower temperatures, which condensation must be avoided in the operation of the gas-liquid absorption process.

The liquid hexafluoroisopropyl alcohol phase may contain small amounts of foreign materials which may enter the process through the feed streams or because of the way the process is operated. The most important of such foreign materials probably will be water introduced to remove the last traces of the solvent from the off-gas streams and not completely separated in the solvent recovery operations. The presence of small amounts (up to about 10%) of water in the hexafluoroisopropyl alcohol used as the selective solvent will reduce the solubility of all gases, but will increase the selectivity of the process. In designing a plant for a particular separation with water-scrubbing of off-gases, a compromise will normally be made between the completeness with which the recycled solvent is separated from water and the size and type of absorption equipment used so as to strike a balance between solubility and selectivity to produce the most economical process. The amount of water present in the recycled solvent preferably will be below about 10% and, in many cases, will be below about 5%.

Certain other impurities can also be present in the hydrocarbons to be separated by absorption in the process. For instance, hydrogen sulfide, other sulfur-containing impurities, carbon dioxide, nitrogen-containing compounds, and other materials which normally occur in small amounts in most oil refinery products or which may be added in small quantities to these products for the protection of refinery equipment or for other desirable ends can be removed either before or after the absorption step of the process, as is convenient. For example, any small amounts of carbon dioxide and hydrogen sulfide can be removed by scrubbing the gas with an aqueous solution of caustic soda, potassium carbonate, an ethanol amine, or any of the other materials conventionally employed to remove acidic gases from hydrocarbon streams. However, no evidence has been found that any of these trace contaminants reacts with the solvent hexafluoroisopropyl alcohol in any way.

In the embodiment illustrated in the drawing, the absorbed propylene-rich gas is separated from the solvent by flashing at a higher temperature and/or a lower pressure than was used for absorption. In a variant process, an absorbed butene-rich gas can be separated from the solvent by fractional distillation. A third method which can be used is addition of water or some other material miscible with the hexafluoroisopropyl alcohol solvent but not with the absorbed gases. Other separation means can be used which will readily suggest themselves to one skilled in the art.

In the process illustrated in the drawing, traces of solvent are removed from the off-gas by water scrubbing. In other variations of the process, they can be removed by reflux of the liquefied product gases, that is, by partially liquefying the off-gases and employing the liquefied gases to scrub traces of solvent from the off-gases, and then recycling the mixture of liquefied gases and solvent as part of the feed. They can also be separated by such other means as passage of the gas stream through refrigeration equipment to condense the solvent but not the product gases, by passage of the gas stream through adsorbers such as activated carbons, inorganic gels, molecular sieves, or activated clays, or by other means such as are commonly used for the separation of such traces of higher-boiling solvents from petroleum gases.

In order to more clearly illustrate this invention, preferred modes of practicing it, and the advantageous results to be obtained thereby, the following examples are given in which the parts and proportions are by weight except where specifically indicated otherwise.

*Example 1*

The solubilities of various hydrocarbons in hexafluoroisopropyl alcohol given in Table I were determined in the following way: A jacketed and agitated flask was fitted with a gas burette, a dropping funnel for adding solvent, and a water manometer. The flask and burette were filled with the test gas at about room temperature (26° C.) by sweeping or by repeated evacuation. The solvent was then added dropwise to the flask. As the gas dissolved or was absorbed in the solvent hexafluoroisopropyl alcohol, a pressure drop was noted on the water manometer. Water was then forced into the bottom of the gas burette to equalize the pressure in the system with the atmospheric pressure as shown on the water manometer. After the desired amount of solvent was added, the flask was agitated and additional gas was introduced until equilibrium was reached. The volume of gas absorbed was determined by the amount of gas displaced from the gas burette.

TABLE I.—SOLUBILITY OF VARIOUS HYDROCARBONS IN HEXAFLUOROISOPROPYL ALCOHOL

| Hydrocarbon: | Average solubility ml. gas/100 ml. solvent |
|---|---|
| Ethane | [1] 80 |
| Ethylene | [1] 80 |
| Acetylene | 200 |
| Propane | 100 |
| Propylene | 300 |
| Propadiene (Allene) | 560 |
| Methyl acetylene | 1000 |
| n-Butane | 480 |
| Isobutane | 460 |
| Isobutylene | 1460 |
| 1-butene | 1500 |
| 2-butene (mixture of cis and trans isomers) | 1560 |
| 1,3-butadiene | 2280 |

[1] The experimental method is such that these values were obtained even though the "true" values may have been, say, 60 for ethane and 90 for ethylene.

This example shows the influence of the number of carbon atoms present in gaseous hydrocarbons and of the kind and position of unsaturation on the solubility of the gases in hexafluoroisopropyl alcohol. The data indicate the combinations of gases which can be separated by preferential absorption.

*Example 2*

The solubilities of ethane and ethylene in hexafluoroisopropyl alcohol at the elevated pressures shown in Table II were determined by measurements in a 300 ml. agitated pressure autoclave at room temperature. A convenient amount of hexafluoroisopropyl alcohol was put into the autoclave and the gaseous hydrocarbon mixture was added until the desired pressure was reached. The solvent was stirred and additional gas was added until there was no drop in pressure after a one minute period of agitation. The pressure of the system was noted, the solution drawn off at the bottom of the autoclave into an ice-cooled receiver, and the pressure was noted at which the autoclave became empty of liquid. The gas dissolved in the liquid was adiabatically cooled when the pressure on the gas-liquid system was released; e.g., when the gas saturated liquid was released from the bottom of the autoclave. For this reason, the gas-liquid stream was fed through a series of coils immersed in a room-temperature water bath. The gas and liquid were warmed to room temperature in the bath, the liquid being collected at this point and the gas being allowed to bubble through water to remove hexafluoroisopropyl alcohol. This stream of gas was then metered through a wet-test meter and the volume of gaseous material was noted. The volume of gas evolved was corrected by adding the amount dissolved in the solvent at room temperature and the equilibrium pressure was assumed to be the average of the initial and final pressures of the autoclave (which differed by 5 to 20 p.s.i.) on the basis of scouting measurements which showed a smooth change in gas solubility with pressure.

TABLE II.—SOLUBILITIES OF ETHANE AND ETHYLENE IN HEXAFLUOROISOPROPYL ALCOHOL AT ELEVATED PRESSURES

| Pressure, p.s.i.a. | Solubility in liters gas/ 100 ml. solvent | |
|---|---|---|
| | Ethane | Ethylene |
| 102 | 1.60 | |
| 105 | | 2.28 |
| 200 | 3.40 | 4.80 |
| 290 | 5.48 | |
| 292 | | 7.32 |
| 390 | 9.72 | 10.86 |

This example shows that the solubilities of typical paraffinic and olefinic gases increase with pressure to essentially the same degree. This example also indicates that ethylene and ethane can be separated at elevated pressure even though solubility measurements at atmospheric pressure (data in Table I) did not indicate such a separation.

*Example 3*

The principles and procedures described in "Gas Chromatography" by A. I. M. Keulmans (pages 170 to 174 and 182 to 190 of the second (1959) edition published by Rheinhold Publishing Co., New York) were used to determine the Henry's law solubility constant at infinite dilution in hexafluoroisopropyl alcohol of each of the gases listed in Table III. The chromatographic column was charged with "Gas Chrom" Z (a calcined diatomaceous earth specially treated to reduce the permanent absorption of gases in gas chromatographic analysis obtained from the Applied Science Laboratories, State College, Pa.) and wet with hexafluoroisopropyl alcohol. This method depends on the fact that small gas samples injected into a chromatographic column pass through the column at a rate dependent on their solubilities in the solvent dispersed on the solid substrate in the column.

TABLE III.—HENRY'S LAW CONSTANTS FOR SOLUBILITIES OF GASES FROM GAS CHROMATOGRAPHIC MEASUREMENTS

| Hydrocarbon | Henry's Law Constant | | |
|---|---|---|---|
| | 25° C. | 50° C. | 75° C. |
| Acetylene | 33,500 | | |
| Ethylene | 87,000 | | |
| Ethane | 151,000 | | |
| Propylene | 20,200 | | |
| Propane | 55,400 | 49,000 | 97,200 |
| Butadiene | 5,550 | 6,620 | |
| 2-butene (cis) | 5,530 | | |
| 2-butene (trans) | 6,980 | | |
| Isobutylene | 6,030 | 7,410 | |
| Butane | 20,900 | 21,900 | 46,700 |
| Isobutane | 25,800 | | 20,900 |

The Henry's law solubility constants are recognized as indicating the ease of separation of gases by selective absorption in the solvent used, the ratios of the solubility constants being the preferred indicators of ease of separation. Thus, the ratio of the Henry's law constants for ethane and ethylene from Table III is $$151,000/87,000 = 1.73$$

which indicates that these two gases can be separated by the process of this invention. Measurements of the relative volatilities of these gases in simple distillation (see Chu, "Vapor-Liquid Equilibrium Data," Edwards, Ann Arbor, 1956) show a value of 1.25, with ethane the more volatile. It is evident that these two gases are separated more easily by preferential absorption with hexafluoroisopropyl alcohol than by simple distillation. Similarly, the ratios of the Henry's law constants indicate that acetylene and ethylene can be separated by differential absorption, that propylene can be separated from propane, and that the acetylenic and olefinic four-carbon hydrocarbons can be separated from the corresponding paraffinic hydrocarbons. Failure of the Henry's law constants to increase regularly with higher temperature in some cases is an indication of the unusual solvent properties of hexafluoroisopropyl alcohol. The Henry's law constant depends primarily on two factors: (1) the vapor pressure of the absorbed gas, which usually increases at higher temperatures in a uniform way, and (2) the "activity" of the gas when dissolved in the solvent, which usually decreases with higher temperatures but which with hexafluoroisopropyl alcohol passes through a maximum between 25° C. and 75° C. The relatively small changes in the Henry's law constants between 25° C. and 50° C., for butadiene, isobutylene and butane and the decrease between 25° C. and 75° C. for propane and isobutane show that the increasing vapor pressures and decreasing activities largely offset each other. The relatively large increase in Henry's law constant between 50° C. and 75° C. for propane and butane shows the effect of considerable increase in vapor pressure and small increases in activity.

This example shows the influence of the number of carbon atoms in gaseous hydrocarbons and of the kind and place of unsaturation on the solubility of the hydrocarbons in hexafluoroisopropyl alcohol. The data supplement that of Example 1 in indicating that preferential absorption in hexafluoroisopropyl alcohol can be used to separate gaseous hydrocarbons of different kinds or degrees of unsaturation.

*Example 4*

The solubilities of three-carbon hydrocarbons at elevated pressures shown in Table IV were obtained by the same procedure as the solubilities in Example 2.

TABLE IV.—SOLUBILITIES OF THREE-CARBON HYDROCARBONS AT ELEVATED PRESSURES

| Gas | Average Pressure, p.s.i.a. | Solubility, liters gas/100 ml. Solvent |
| --- | --- | --- |
| Propylene | 127 | 21.72 |
| | 60 | *6.4 |
| Propane | 105 | 6.10 |
| | 60 | *3.6 |
| Methyl Acetylene | 67 | 20.30 |
| | 60 | *16.8 |
| | 45 | 10.46 |
| Allene | 89 | 16.18 |
| | 63 | 7.84 |
| | 60 | *7.1 |
| | 31 | 4.12 |

*Interpolated from curve.

This example shows the influence of pressure on the solubility of a group of three-carbon hydrocarbons containing different degrees of unsaturation. The data indicates that all combinations of these gases can be separated by differential absorption in hexafluoroisopropyl alcohol at moderately elevated pressures.

*Example 5*

The solubilities of four-carbon hydrocarbons at elevated pressures shown in Table V were also determined by the same procedure as the solubilities in Example 2.

TABLE V.—SOLUBILITIES OF FOUR-CARBON HYDROCARBONS AT ELEVATED PRESSURES

| Gas | Average Pressure, p.s.i.a. | Solubility, liters gas/100 ml. Solvent |
| --- | --- | --- |
| n-Butane | 35 | 3.60 |
| | 31 | *2.4 |
| 1-Butene | 34 | 7.64 |
| | 31 | *6.0 |
| 2-butene | 31 | 7.44 |
| Isobutane | 55 | 11.26 |
| | 41 | *5.4 |
| | 31 | *2.9 |
| Isobutylene | 41 | 10.54 |
| | 31 | *5.2 |
| 1,3-butadiene | 34 | 7.88 |
| | 31 | *6.9 |

*Interpolated from curve.

This example shows the solubilities of a group of four-carbon hydrocarbons at moderately elevated pressures. The data indicates that the olefinic and paraffinic hydrocarbons can be separated by differential absorption in hexafluoroisopropyl alcohol in the pressure range shown.

*Example 6*

The effect of elevated pressures on the solubility of mixtures of propylene and propane in hexafluoroisopropyl alcohol and on the distribution of these gases between the vapor and liquid phases was determined by the following procedure. Fifty milliliter samples of hexafluoroisopropyl alcohol were sucked into a 300 ml. agitated pressure autoclave at room temperature. Approximately equal amounts by weight of propylene and propane were added to the autoclave up to the desired test pressure and the contents of the autoclave were agitated. A liquid solution was drawn off at the bottom of the autoclave into an ice-cooled receiver and the pressure was noted at the end of this withdrawal. The gaseous hydrocarbon mixtures, evolved from the depressurized solution withdrawn from the autoclave and subsequently warmed to room temperature, were bubbled through water to remove any evaporated hexafluoroisopropyl alcohol and their volume was determined with a gas meter. This volume was corrected by adding the volume of the gases expected to be dissolved in the solvent at room temperature and ambient pressure. These volumes were converted to weight percent of hydrocarbon in the solution of hydrocarbon and solvent to arrive at the solubilities shown in Table VI. The equilibrium pressure was assumed to be the average of the initial and final pressures of the autoclave. Samples of the gas mixtures evolved from the solution and of the gas mixtures remaining in the vapor space of the autoclave were analyzed to determine the relative amounts of propylene and propane present in each. The data obtained are given in Table VI, along with a selectivity factor defined by the formula $$\text{Selectivity Factor} = \left[\frac{\text{wt. percent propylene}}{\text{wt. percent propane}}\right] \text{ in liquid} \times \left[\frac{\text{wt. percent propane}}{\text{wt. percent propylene}}\right] \text{ in vapor}$$

TABLE VI.—CHANGE IN SOLUBILITY AND SELECTIVITY OF PROPYLENE-PROPANE MIXTURES WITH PRESSURE

| Pressure (p.s.i.a.) | Solubility (wt. percent in Solution) | Selectivity Factor |
| --- | --- | --- |
| 0 | 0 | *2.75 |
| 35 | 4 | 2.22 |
| 85 | 20 | 1.76 |
| 115 | 40 | 1.47 |
| 125 | 43 | 1.23 |
| 135 | 47 | 0.93 |
| 155 | 55 | 0.88 |

*Henry's law constant at infinite dilution.

This example shows that actual separations obtained at moderate pressures approach those predicted from gas solubilities and that significant deviations can be obtained at pressures at which the gas dissolved becomes a significant part of the solution, e.g. above 10% by weight.

*Example 7*

The solubility of propylene and propane in hexafluoroisopropyl alcohol at 0° C. and atmospheric pressure was determined to be 1040 ml. and 380 ml. respectively per 100 ml. of solvent.

This example (in comparison with Example 1) shows the expected increased in solubility of typical paraffinic and olefinic gases at decreased temperatures. The data indicates that differential absorption separation processes using hexafluoroisopropyl alcohol can be operated over a range of temperatures.

*Example 8*

The procedures of Example 2 were used to determine the solubilities of propane and propylene in hexafluoroisopropyl alcohol containing various amounts of added water. The data obtained are shown in Table VII.

TABLE VII.—SOLUBILITIES OF PROPANE AND PROPYLENE IN HEXAFLUOROISOPROPYL ALCOHOL CONTAINING WATER

| Pressure, p.s.i.a. | Percent Water | Solubility in liters gas/100 ml. solvent | |
|---|---|---|---|
| | | Propane | Propylene |
| 57 | 0.0 | 3.6 | 6.4 |
| 105 | 0.0 | 10.8 | 22.4 |
| 57 | 0.5 | 4.4 | 6.3 |
| 105 | 0.5 | 13.0 | 21.0 |
| 102 | 0.5 | | 19.0 |
| 57 | 1.0 | 3.2 | 4.4 |
| 100 | 1.0 | 8.3 | |
| 105 | 1.0 | 9.2 | 16.2 |
| 57 | 10.0 | 2.0 | 5.0 |
| 105 | 10.0 | 4.8 | 14.8 |

This example shows the decrease in solubility of typical paraffinic and olefinic hydrocarbon gases in hexafluoroisopropyl alcohol with addition of water to the solvent. The data indicates that the solubility ratios and therefore the degree of separation in a differential absorption process can be changed slightly by the controlled limited addition of water to the solvent. At the same time, the selectivity can be increased, whereby a desired balance between solubility and selectivity can be obtained by control of the amount of water present in the solvent so as to obtain the most economical process. The data also indicate the possibility of recovering the solvent from off-gas streams by water washing and the desirability of removing excess water from the solvent in such processes before recycling.

*Example 9*

A laboratory apparatus was assembled with equipment and hydrocarbon and solvent flow patterns corresponding to those shown in the drawing, but omitting the solvent recycle and the still for separating recovered hexafluoroisopropyl alcohol from water, and except that the water scrubbers operated from separate reservoirs. The equipment was operated at about atmospheric pressure and ambient temperature (about 27° C.) except for the flash chamber which was maintained near the 59° C. boiling point of hexafluoroisopropyl alcohol. The absorber was a 36 inch by 1 inch glass tube filled with ⅛ inch glass helices. To this absorber at atmospheric pressure were fed hexafluoroisopropyl alcohol at a rate of 36.5 ml./min. and a gas mixture at a rate of 200 ml./min. The gas mixture contained 51.2% propylene and 48.8% propane as analyzed by vapor phase chromatography. The gas mixture was added at the center of the absorber. The hexafluoroisopropyl alcohol (containing absorbed gases) from the bottom of the absorber was passed through a liquid trap into the heated flash chamber, and the evolved gases were passed through a water-cooled condenser and divided by a solenoid-operated valve to return 72% of the gas to the bottom of the absorber as reflux and to pass 28% through a water scrubber and a gas meter. The unabsorbed gas from the top of the column was passed through a water scrubber and a gas meter. After operation for 23 minutes, a sample of the propane-rich gas from the top of the absorber contained propylene and propane in the ratio of 19.7% to 80.3% and a sample of the propylene-rich gas from the flash chamber contained propylene and propane in a ratio of 85.3% to 14.7%, as determined by vapor phase chromatography.

This example shows the separation by differential absorption of a gaseous mixture containing approximately equal amounts of propylene and propane into mixtures containing over 80% propylene and over 80% propane respectively. The design and operation of equipment of the same type to obtain more complete separation is well within the skill of one familiar with the field of gas absorption and separation.

*Example 10*

The assembly shown in the drawing was used without the flash chamber and reflux arrangement. It was operated at about atmospheric pressure and ambient temperature, about 27° C. Hexafluoroisopropyl alcohol was fed at atmospheric pressure to the top of the absorber at a rate of 34.2 ml./min., while feeding to the bottom of the absorber a mixture containing propylene and propane in a ratio of 55.6% to 44.4% (as determined by vapor phase chromatography) at a rate of 273 ml./min. The propane-rich off-gas from the top of the absorber was passed through a water scrubber and a gas meter and the hexafluoroisopropyl alcohol from the bottom of the absorber was passed through a liquid trap into a receiver. After operation for 38 minutes, a sample of the propane-rich gas from the top of the absorber contained propylene and propane in a ratio of 34.0% to 66.0%, as determined by vapor phase chromatography. After operation for 41 minutes, the flows were stopped and the hexafluoroisopropyl alcohol containing dissolved gases was heated to boiling to obtain an evolved gas which contained propylene and propane in a volume ratio of 68.2% to 31.8%.

This example shows the separation of a gaseous mixture containing approximately equal amounts of propylene and propane into mixtures (1) containing approximately two volumes of propylene to one volume of propane and (2) two volumes of propane to one volume of propylene.

*Example 11*

The assembly shown in the drawing was used and was operated at about atmospheric pressure and ambient temperature, about 27° C., except for the flash chamber which was maintained near the 59° C. boiling point of hexafluoroisopropyl alcohol. Hexafluoroisopropyl alcohol was fed at atmospheric pressure to the top of the absorber at a rate of 18 ml./min. while feeding a mixture of butanes and butenes at a rate of about 500 ml./min. to the middle of the absorber. After operating for one hour, the gas mixture was being fed at a rate of 480 ml./min. the saturate-rich off-gas was being collected at a rate of 360 ml./min., and the olefin-rich off-gas was being collected at a rate of 120 ml./min. The feed and the two off-gas streams had the analyses in percent shown in Table VIII as determined by vapor phase chromatography.

TABLE VIII.—SEPARATION OF FOUR-CARBON HYDROCARBONS

| Component | Feed Stream | Paraffin Rich Stream | Olefin Rich Str. |
|---|---|---|---|
| n-Butane | 12.3 | 12.8 | 1.9 |
| Isobutane | 46.2 | 60.2 | 7.1 |
| 1-butene | 23.2 | 17.0 | 46.8 |
| 2-butene | 14.5 | 7.1 | 30.5 |
| Isobutene | 0.17 | 0.15 | 1.1 |
| 1,3-butadiene | 3.54 | 2.7 | 13.0 |

This example shows the separation of a gaseous mixture of butanes and butenes into fractions enriched respectively in butanes and butenes.

It will be understood that the foregoing drawings and examples are given for illustrative purposes solely, and that this invention is not limited to the specific embodiments shown and described therein. On the other hand, it will be readily apparent to those skilled in the art that, subject to the limitations set forth in the general description, many variations and modifications can be made in the mixtures of hydrocarbons, the conditions, the procedures, and the apparatus employed without departing from the spirit or the scope of this invention.

From the preceding description, it will be apparent that this invention provides a new and improved process for separating mixtures of normally gaseous hydrocarbons of varying degrees of unsaturation according to their differing degrees of unsaturation. The hexafluoroisopropyl alcohol is readily separated from the hydrocarbons and recovered for reuse by simple and economical procedures. The process is easily carried out in relatively simple and cheap equipment and is such that it is practical for use in small plants where only small volumes of the hydrocarbon gases are involved as well as in big refineries where large volumes of the hydrocarbon gases are obtained. Therefore, it will be apparent that this invention constitutes a valuable contribution to an advance in the art.

The embodiments of the invention in which an exclusive property or privilege is claimed are defined as follows:

1. The process for separating components of a mixture of normally gaseous hydrocarbons which comprises
   (a) contacting a gaseous mixture of hydrocarbons which consists essentially of a plurality of normally gaseous acyclic hydrocarbons of 2–4 carbon atoms which have normal boiling points within 25° C. of each other, of which at least one is a member of a class of the group consisting of paraffinic, monoolefinic and diolefinic hydrocarbons and at least one other is a member of a more unsaturated class of the group consisting of monoolefinic, diolefinic and acetylenic hydrocarbons
   (b) with liquid hexafluoroisopropyl alcohol and absorbing therein said other hydrocarbon;
   (c) separating the liquid solvent phase from the gaseous raffinate phase; and
   (d) recovering the absorbed hydrocarbon from the hexafluoroisopropyl alcohol in the liquid solvent phase.

2. The process for separating components of a mixture of normally gaseous hydrocarbons which comprises
   (a) contacting a gaseous mixture of hydrocarbons which consists essentially of a plurality of normally gaseous acyclic hydrocarbons of the same number of carbon atoms in the range of 2–4 carbon atoms of which at least one contains a lower number of hydrogen atoms than another
   (b) with liquid hexafluoroisopropyl alcohol and absorbing therein the hydrocarbon which contains the lower number of hydrogen atoms;
   (c) separating the liquid solvent phase from the gaseous raffinate phase; and
   (d) recovering the absorbed hydrocarbon from the hexafluoroisopropyl alcohol in the liquid solvent phase.

3. The process for separating components of a mixture of normally gaseous hydrocarbons which comprises
   (a) contacting a gaseous mixture of hydrocarbons which consists essentially of a plurality of acyclic hydrocarbons of 3 carbon atoms and different numbers of hydrogen atoms
   (b) with liquid hexafluoroisopropyl alcohol and absorbing therein the hydrocarbon having the lowest number of hydrogen atoms;
   (c) separating the liquid solvent phase from the gaseous raffinate phase; and
   (d) recovering the absorbed hydrocarbon from the hexafluoroisopropyl alcohol in the liquid solvent phase.

4. The process for separating components of a mixture of normally gaseous hydrocarbons which comprises
   (a) contacting a gaseous mixture of hydrocarbons which consists essentially of propane and propylene
   (b) with liquid hexafluoroisopropyl alcohol and absorbing the propylene therein;
   (c) separating the liquid solvent phase from the gaseous raffinate phase; and
   (d) recovering the absorbed propylene from the hexafluoroisopropyl alcohol in the liquid solvent phase.

5. The process for separating components of a mixture of normally gaseous hydrocarbons which comprises
   (a) contacting a gaseous mixture of hydrocarbons which boils in the range of from about −50° C. to about −40° C. at 760 mm. Hg pressure and consists essentially of from about 40% to about 70% by weight of propylene and from about 60% to about 30% by weight of propane
   (b) with liquid hexafluoroisopropyl alcohol and absorbing therein a hydrocarbon mixture enriched in propylene;
   (c) separating the liquid solvent phase from the gaseous raffinate phase; and
   (d) recovering the absorbed hydrocarbon mixture from the hexafluoroisopropyl alcohol in the liquid solvent phase.

6. The process for separating components of a mixture of normally gaseous hydrocarbons which comprises
   (a) contacting a gaseous mixture of hydrocarbons which consists essentially of propylene and at least one other more unsaturated acyclic hydrocarbon of 3 carbon atoms
   (b) with liquid hexafluoroisopropyl alcohol and absorbing therein the more unsaturated hydrocarbon;
   (c) separating the liquid solvent phase from the gaseous raffinate phase; and
   (d) recovering the absorbed hydrocarbon from the hexafluoroisopropyl alcohol in the liquid solvent phase.

7. The process for separating components of a mixture of normally gaseous hydrocarbons which comprises
   (a) contacting a gaseous mixture of hydrocarbons which consists essentially of a plurality of normally gaseous acyclic hydrocarbons of 4 carbon atoms of which at least one contains a lower number of hydrogen atoms than another
   (b) with liquid hexafluoroisopropyl alcohol and absorbing therein the hydrocarbon which contains the lower number of hydrogen atoms;
   (c) separating the liquid solvent phase from the gaseous raffinate phase; and
   (d) recovering the absorbed hydrocarbon from the hexafluoroisopropyl alcohol in the liquid solvent phase.

8. The process for separating components of a mixture of normally gaseous hydrocarbons which comprises
   (a) contacting a gaseous mixture of hydrocarbons which consists essentially of a plurality of normally gaseous hydrocarbons of 4 carbon atoms of which at least one is a paraffinic hydrocarbon and at least one other is an unsaturated hydrocarbon
   (b) with liquid hexafluoroisopropyl alcohol and absorbing therein the unsaturated hydrocarbon;
   (c) separating the liquid solvent phase from the gaseous raffinate phase; and
   (d) recovering the absorbed hydrocarbon from the hexafluoroisopropyl alcohol in the liquid solvent phase.

9. The process for separating components of a mixture of normally gaseous hydrocarbons which comprises
   (a) contacting a gaseous mixture of hydrocarbons which boils in the range of from about −15° C. to about +5° C. at 760 mm. Hg pressure and consists essentially of from about 25% to about 75% by weight of olefins of 4 carbon atoms and from about 75% to about 25% by weight of butanes
   (b) with liquid hexafluoroisopropyl alcohol and absorbing therein a hydrocarbon mixture enriched in olefins;
   (c) separating the liquid solvent phase from the gaseous raffinate phase; and
   (d) recovering the absorbed hydrocarbon mixture from the hexafluoroisopropyl alcohol in the liquid solvent phase.

10. The process for separating components of a mixture of normally gaseous hydrocarbons which comprises
    (a) contacting a gaseous mixture of hydrocarbons which consists essentially of a plurality of normally gaseous acyclic hydrocarbons of the same number of carbon atoms in the range of 2–4 carbon atoms of which at least one contains a lower number of hydrogen atoms than another
  (b) with liquid hexafluoroisopropyl alcohol and absorbing therein the hydrocarbon which contains the lower number of hydrogen atoms;
  (c) separating the liquid solvent phase from the gaseous raffinate phase; and
  (d) washing the liquid solvent phase with water to remove the hexafluoroisopropyl alcohol from the hydrocarbons absorbed therein.

11. The process for separating components of a mixture of normally gaseous hydrocarbons which comprises
  (a) contacting a gaseous mixture of hydrocarbons which consists essentially of a plurality of normally gaseous acyclic hydrocarbons of the same number of carbon atoms in the range of 2–4 carbon atoms of which at least one contains a lower number of hydrogen atoms than another
  (b) with liquid hexafluoroisopropyl alcohol and absorbing therein the hydrocarbon which contains the lower number of hydrogen atoms;
  (c) separating the liquid solvent phase from the gaseous raffinate phase; and
  (d) recovering the absorbed hydrocarbon from the liquid solvent phase by distillation.

No references cited.

DELBERT E. GANTZ, *Primary Examiner.*

H. LEVINE, *Assistant Examiner.*